(12) United States Patent
Havinis et al.

(10) Patent No.: US 6,463,288 B1
(45) Date of Patent: Oct. 8, 2002

(54) SYSTEM AND METHOD FOR MONITORING POSITIONING REQUESTS FOR MOBILE SUBSCRIBERS

(75) Inventors: Theodore Havinis, Plano; David Boltz, Garland, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/272,694

(22) Filed: Mar. 18, 1999

(51) Int. Cl.[7] ................................................ H04Q 7/20
(52) U.S. Cl. ...................... 455/456; 455/404; 455/406
(58) Field of Search ................................. 455/456, 404, 455/406; 342/357.13, 457

(56) References Cited

U.S. PATENT DOCUMENTS

| | | | | |
|---|---|---|---|---|
| 5,787,354 A | * | 7/1998 | Gray | 455/456 |
| 5,918,159 A | * | 6/1999 | Fomukong | 455/38.1 |
| 6,049,711 A | * | 4/2000 | Ben-Yehezkel | 455/414 |
| 6,049,718 A | * | 4/2000 | Stewart | 455/456 |
| 6,167,025 A | * | 12/2000 | Hsing | 370/216 |

* cited by examiner

Primary Examiner—Vivian Chin
Assistant Examiner—James K Moore
(74) Attorney, Agent, or Firm—Jenkens & Gilchrist, P.C.

(57) ABSTRACT

A telecommunications system and method is disclosed for monitoring all successful and unsuccessful attempts by third parties to locate a mobile subscriber and providing identity information associated with those third parties to the mobile subscriber. Whenever a positioning request is received by a Gateway Mobile Location Center (GMLC), the GMLC, before returning a response to the requester, e.g., either location information or a rejection message, maintains a positioning record of all information related to the positioning request for the mobile subscriber, including the identity of the requester. The GMLC can download this positioning record to a node associated with the mobile subscriber, such as a Mobile Station (MS) or billing center.

24 Claims, 7 Drawing Sheets

SYSTEM AND METHOD FOR MONITORING POSITIONING REQUESTS FOR MOBILE SUBSCRIBERS

BACKGROUND OF THE PRESENT INVENTION

1. Field of the Invention

The present invention relates generally to telecommunications systems and methods for positioning a mobile subscriber within a cellular network, and specifically to monitoring received positioning requests for a mobile subscriber.

2. Background and Objects of the Present Invention

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

Figure 1:
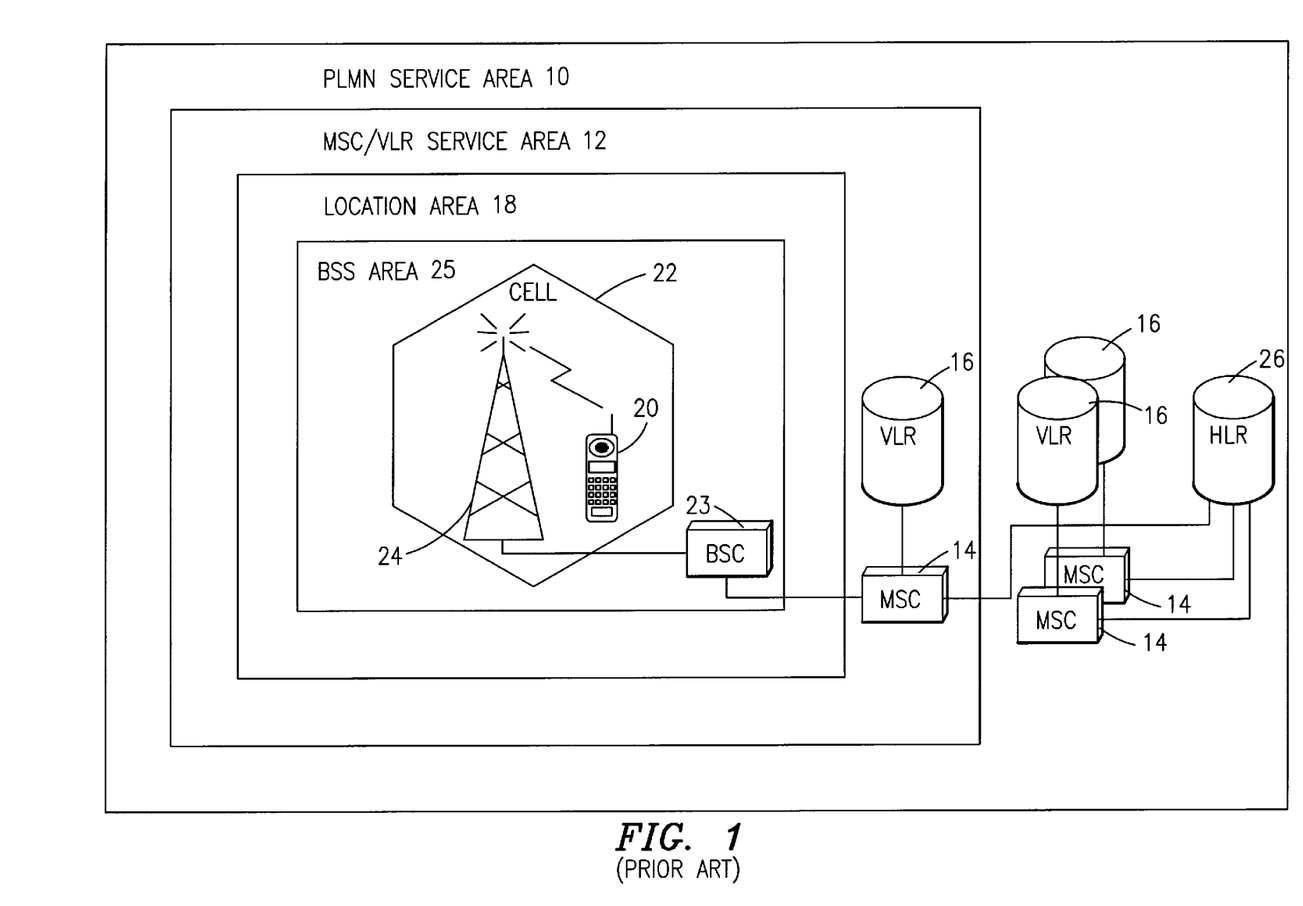
FIG. 1 is a block diagram of a conventional wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC 14 that controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the MS 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

Figure 2:
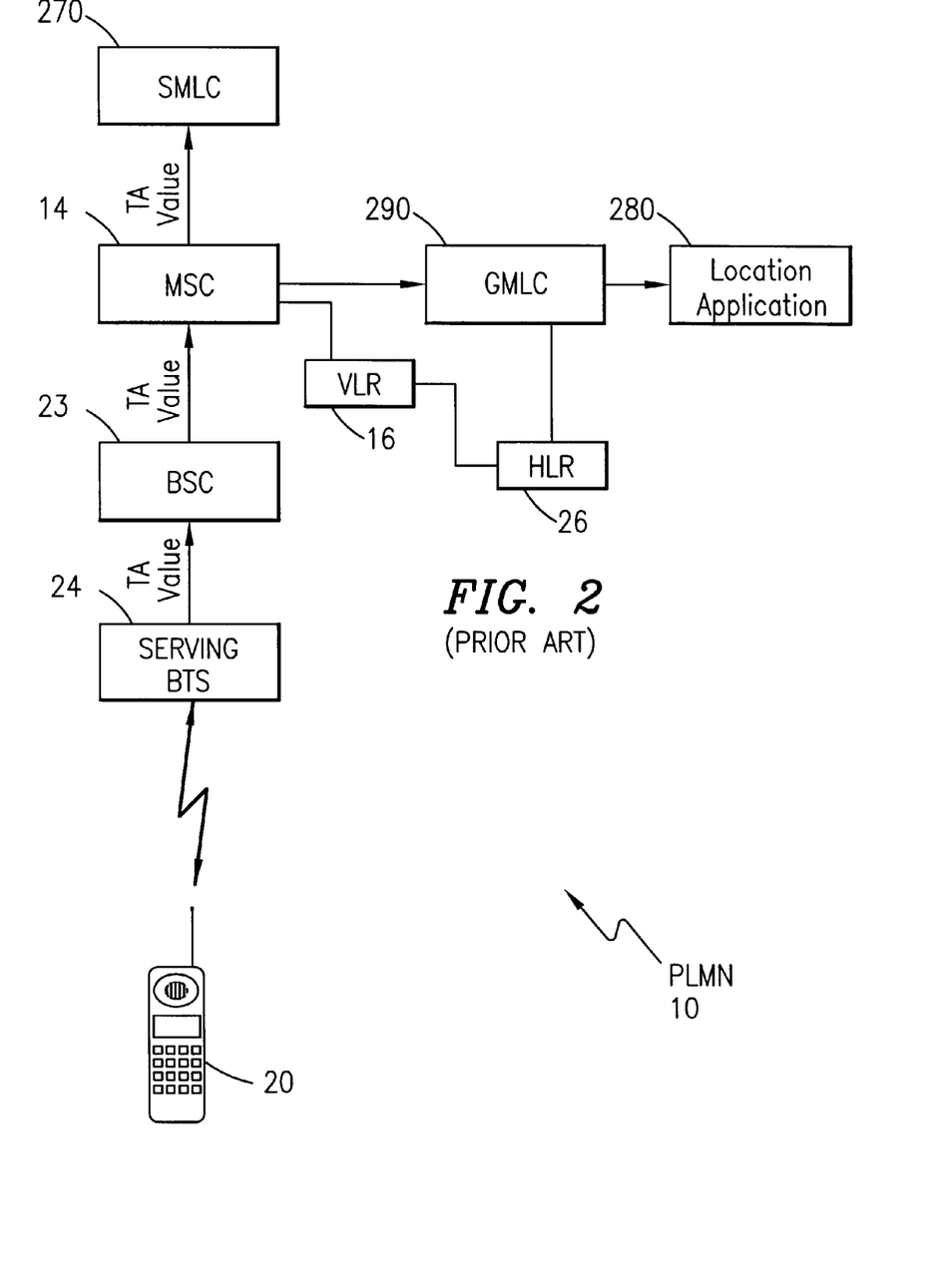
FIG. 2 is a block diagram illustrating some aspects involved in a conventional positioning of a mobile station within a cellular network.

As can be seen in FIG. 2 of the drawings, upon a network positioning request, the MSC 14 obtains, from the serving BTS 24 and BSC 23, a Timing Advance (TA) value, which corresponds to the amount of time in advance that the MS 20 must send a message in order for the serving BTS 24 to receive it in the time slot allocated to that MS 20. The TA value, in turn, provides location information regarding the MS 20 location. This is due to the fact that when a message is sent from the MS 20 to the BTS 24, there is a propagation delay, which depends upon the distance between the MS 20 and the BTS 24. The TA values are expressed in bit periods, and can range from 0 to 63, with each bit period corresponding to approximately 550 meters between the MS 20 and the BTS 24.

This TA value is forwarded to a Serving Mobile Location Center (SMLC) 270 for use in assisting the calculation of the geographical location of the MS 20. It should be noted that the SMLC 270 can use a number of different positioning mechanisms, including, but not limited to, Time of Arrival (TOA), Enhanced Observed Time Difference (E-OTD) and Global Positioning System (GPS). After the SMLC 270 calculates the MS 20 location, this location can be sent to a Location Application (LA) 280 that requested the positioning. It should be noted that the requesting LA 280 could be located within the MS 20 itself, within the MSC 14 or could be an external node, such as an Intelligent Network (IN) node. If the LA 280 is not within the MS 20 or within the MSC 14, the location information is sent to the requesting LA 280 via the MSC 14 and a Gateway Mobile Location Center (GMLC) 290.

Existing technology can provide mobile subscribers with the ability to prevent LAs 280 from positioning them in order to protect their privacy. However, in some cases, it is necessary for the specific LA 280 to position the MS 20 regardless of the privacy settings of the particular subscriber. For example, when the LA 280 is an emergency center or a law enforcement agency, the community interest in positioning the MS 20 outweighs the subscriber's need for privacy. In this case, the privacy settings of the subscriber will need to be overridden in order for the emergency center or law enforcement agency to position the MS 20. in addition, LAs 280 may need to have the ability to override other location settings established by the subscriber. Thus, a Privacy Override Indicator (POI) (not shown) can be provided by network operators to allow an LA 280 to override the subscriber's privacy settings in order to obtain the location of the mobile subscriber.

The POI is typically assigned on an individual LA 280 basis by a Gateway Mobile Location Center (GMLC) (not shown) during the registration of the LA 280 at the GMLC associated with the PLMN 10 that the LA 280 is located in. Normally, commercial-type LA's 280 are not allowed to override the subscriber's privacy settings, e.g., the assigned value of the POI is "not override." However, certain specific LA's 280, such as law enforcement or E-911, which must be capable of positioning a subscriber regardless of the subscriber's privacy settings, can be assigned a POI with the value "allowed to override subscriber's privacy settings." It should be noted that when the subscriber is roaming, law enforcement LA's 280 will need, in addition to the POI with the value "allowed to override subscriber's privacy settings," a court order in order to be able to override the mobile subscriber's privacy settings.

Furthermore, even though a mobile subscriber has established privacy settings, the mobile subscriber may want to allow certain other subscribers or LAs 280 to have the ability to position the mobile subscriber regardless of the mobile subscriber's privacy settings. Such other subscribers could be, for example, the mobile subscriber's family or member (s) of a particular group, such as, e.g., in the case where the subscriber is an employee of a taxi company, the operations center or the mobile subscriber's manager. For those cases, the mobile subscriber may also want to put limits on the ability of those other subscribers or LA's 280 to position him or her. For example, the mobile subscriber may only want to allow certain LA's 280 to be able to position the mobile subscriber during certain hours or minutes of the day, certain days of the week or certain days, weeks or months of the year. In addition, the mobile subscriber may want to limit the number of allowable repetitive positionings by a particular subscriber or LA 280 per hour, day, week or year.

Therefore, each mobile subscriber can define a Subscriber Location Privacy Profile (SLPP) (not shown), which contains a list of preferred subscribers or LA's 280 that have permission to position the mobile subscriber. The SLPP can also define the conditions under which each of the preferred LA's 280 can position the mobile subscriber. For example, the mobile subscriber can limit the positioning by a particular preferred LA 280 to only certain hours of the day, certain days of the week and/or certain weeks of the year, and can limit the number of times that particular preferred LA 280 can request positioning of the mobile subscriber during those allowed times. The SLPP can preferably be connected to the mobile subscriber's main subscription record in the HLR 26 and can be downloaded to the VLR 16 together with the rest of the subscription information when the MS 20 is within the MSC/VLR area 12 (shown in FIG. 1).

By allowing a mobile subscriber to preserve his or her privacy, an LA 280 may fail in it's attempt to position the mobile subscriber due to a restriction within the mobile subscribers SLPP. However, there is currently no mechanism for providing the identities of these failed requesting LA's 280 to a mobile subscriber. This type of identity information may be beneficial to a mobile subscriber who has been threatened or who has requested certain individuals to not position him or her. Furthermore, LA 280 identity information might be useful to law enforcement agencies conducting an investigation of a missing person, stolen vehicle or stolen property or other type of crime against the mobile subscriber. For example, if a mobile subscriber was positioned by an LA 280, and that mobile subscriber is reported as missing, a law enforcement agency can determine the identity of the requesting LA 280, and subpoena that LA's 280 records to determine the last known location of the missing mobile subscriber. Furthermore, in some cases, the LA 280 identity information may be useful to law enforcement agencies in tracking down criminals who try to position their victims.

Even if an LA 280 is successful in positioning an MS 20, the mobile subscriber is not provided with LA 280 identity information during or after the positioning. Many mobile subscriber's may be curious about who is positioning them. In sum, regardless of whether a positioning request is successful or unsuccessful, the mobile subscriber does not have any knowledge of the identity of the requesting LA 280.

It is, therefore, an object of the present invention to monitor all successful and unsuccessful attempts by a third party to locate a mobile subscriber and to provide identity information concerning that third party to the mobile subscriber.

It is a further object of the present invention to send Location Application identity information directly to a mobile station that was positioned successfully or unsuccessfully.

It is still a further object of the present invention to include Location Application identity information concerning Location Applicant's that attempt to position a mobile subscriber on that mobile subscriber's monthly bill.

It is still a further object of the present invention to maintain a positioning subscriber record including a list of the identities of all requesting Location Applications for a mobile subscriber.

SUMMARY OF THE INVENTION

The present invention is directed to telecommunications systems and methods for monitoring all successful and unsuccessful attempts by third parties to locate a mobile subscriber and providing identity information associated with those third parties to the mobile subscriber. Whenever a positioning request is received by a Gateway Mobile Location Center (GMLC), the GMLC, before returning a response to the requester, e.g., either location information or a rejection message, maintains a record of all information related to the positioning request, including the identity of the requester. The GMLC can download this positioning record to the mobile subscriber's Home Location Register (HLR), which can append at least identity information regarding the requester, and preferably, a time stamp, to the mobile subscriber's permanent record in the HLR. The identity information can be provided directly to the mobile subscriber on the Mobile Station (MS) associated with the mobile subscriber and/or included in the mobile subscriber's monthly bill.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 3:
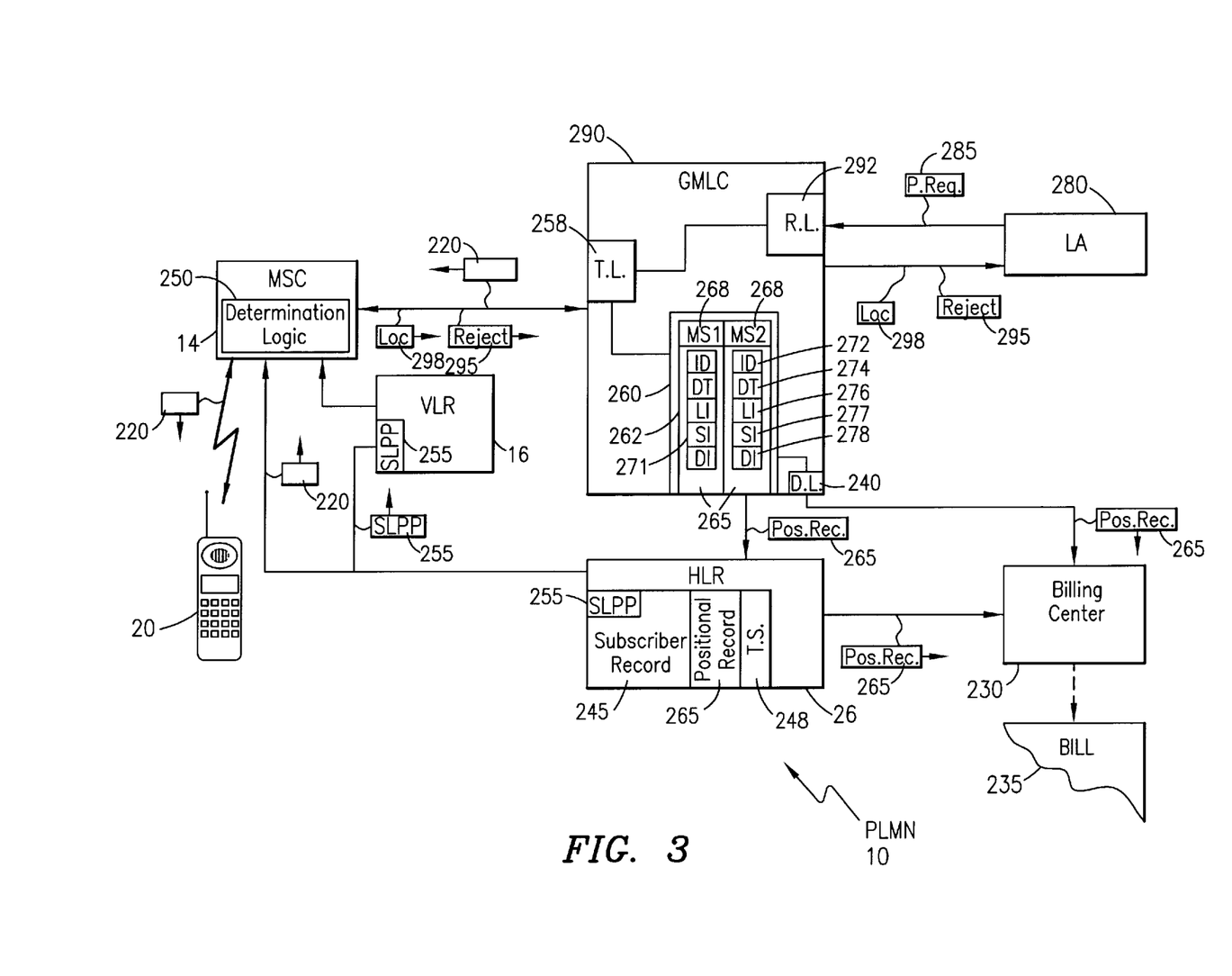
FIG. 3 illustrates the collection, storage and transmission of information related to positioning requests received by a Gateway Mobile Location Center for a mobile station in accordance with embodiments of the present invention.
Figure 4:
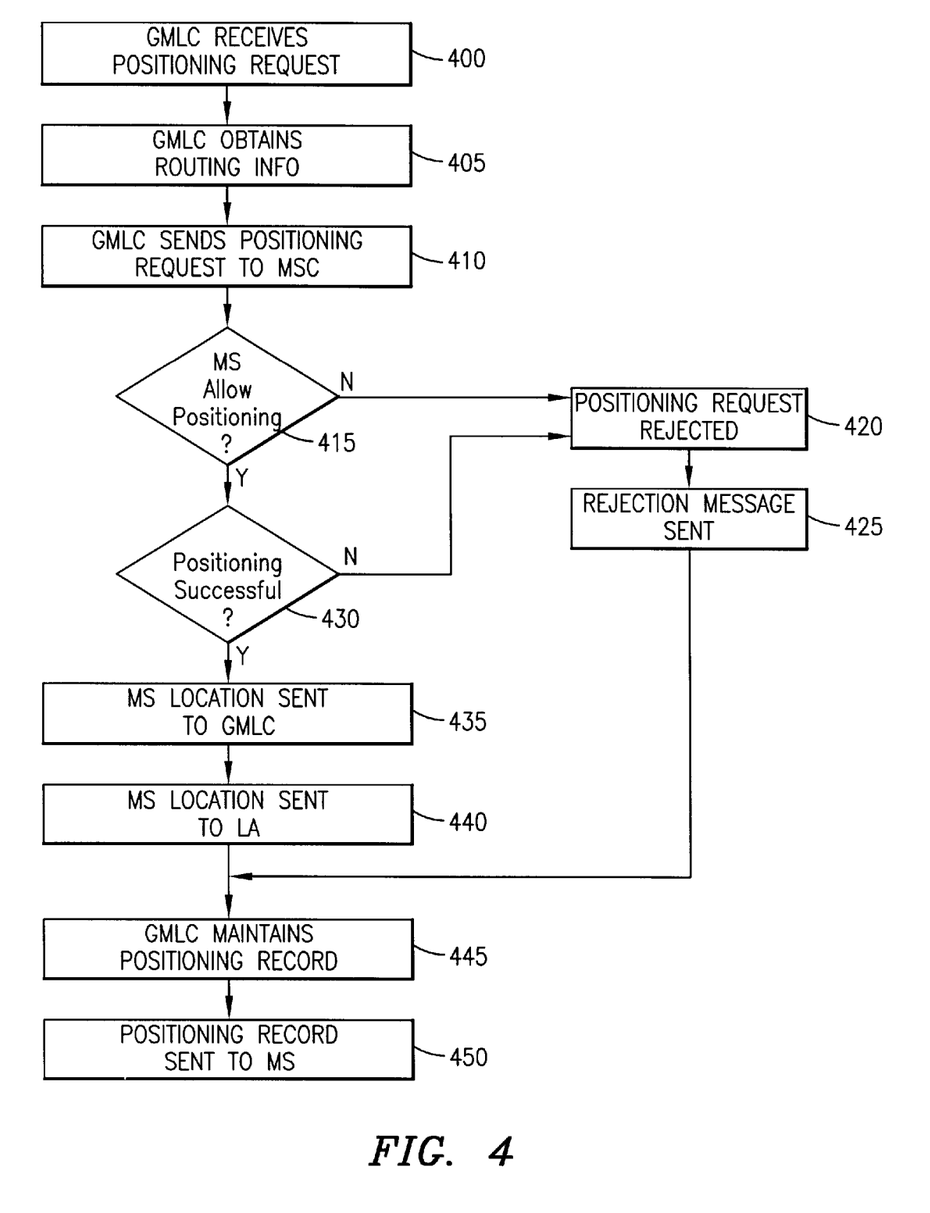
FIG. 4 shows steps in a sample implementation of the collection, storage and transmission process shown in FIG. 3 of the drawings in accordance with embodiments of the present invention.

With reference now to FIG. 3 of the drawings, which will be described in connection with FIG. 4 of the drawings, positioning of a particular target MS 20 typically begins by a Location Application (LA) 280 sending a positioning request 285, which specifies the particular Mobile Station Integrated Services Digital Network (MSISDN) number associated with the target MS 20 to be positioned, to receiving logic within a Gateway Mobile Location Center (GMLC) 290 within the Public Land Mobile Network (PLMN) 10 of the LA 280 (step 400). In response to receiving the positioning request 285 (step 400), the GMLC 290 obtains routing information, e.g., the address for a serving Mobile Switching Center (MSC) 14 from a Home Location Register (HLR) associated with the MS 20 (step 405). Using this MSC 14 address, the GMLC 290 routes the positioning request 285 to the serving MSC.

Once the MSC 14 receives the positioning request (step 410), determination logic 250 within the MSC 14 determines if the requesting LA 280 is allowed to position the MS 20 (step 415). For example, the MSC 14 can first determine whether the MS 20 subscriber has subscribed to positioning services, e.g., Location Services (LCS). If the MS 20 subscriber does subscribe to LCS, the MSC 14 can also compare LA identity information contained within the MS 20 subscriber's Subscriber Location Privacy Profile (SLPP) 255, which is stored within a Visitor Location Register (VLR) 16 associated with the MSC 14, with the LA identity of the requesting LA 280, which is provided with the received positioning request 285, to verify that the MS 20 subscriber does allow positioning to be performed by that requesting LA 280. It should be understood that the LCS and SLPP 255 information is downloaded to the serving VLR 16 associated with the serving MSC 14 together the rest of the mobile subscriber's subscription information with the existing Mobile Application Part (MAP) operation INSERT_SUBSCRIBER_DATA or with the existing MAP operation RESTORE_DATA when the MS 20 registers with the serving MSC 14. In addition, it should be understood that, in some networks, if the MS 20 has not subscribed to any LCS and/or has not defined an SLPP 255, the requesting LA 280 cannot position the MS 20, unless the requesting LA 280 is, for example, a law enforcement agency or an emergency services application.

If the requesting LA 280 is not allowed to position the MS 20 (step 415), the MSC 14 rejects the positioning request 285 (step 420) and a rejection message 295 is sent to the requesting LA (step 425). However, if the requesting LA 280 is allowed to position the MS 20 (step 415), the MSC 14 carries out the positioning request (step 430).

If the serving MSC 14 is unable to successfully position the MS 20 (step 430), the MSC 14 rejects the positioning request 285 (step 420), and sends a rejection message 295 to the requesting LA 280 via the GMLC 290 (step 425). However, if the serving MSC 14 is able to successfully position the MS 20 (step 430), the location 298 of the MS 20 is sent to the GMLC 290 (step 435), which can forward this location information to the requesting LA 280 (step 440).

After the positioning process is completed (step 420 or 440), whether successful (step 440) or unsuccessful (step 420), the GMLC 290 maintains a positioning record 265 per mobile subscriber 268 of all of the relevant positioning information 271 regarding each positioning request 285 received for each mobile subscriber 268 (step 445). Each positioning record 265 can be, for example, a part of a database 262 stored within a memory 260 of the GMLC 290. It should be noted that if the mobile subscriber does not subscribe to LCS, or if the mobile subscriber is roaming in a visiting Public Land Mobile Network (PLMN) 10, the GMLC 290 maintains a temporary positioning record 265 per visiting or non-LCS mobile subscriber 268.

The positioning information 271 recorded per mobile subscriber 268 includes identity information 272 concerning the identity of the LA 280 that sent the positioning request 285 for the mobile subscriber. In addition, date and time information 274 associated with the date and time of each received positioning request 285, as well as location information 276 associated with the mobile subscriber's location at the time of the positioning (if successful), can be stored in the mobile subscriber's positioning record 265. Furthermore, a successful indicator 277 indicating whether the positioning request was successful or unsuccessful, as well as the reason if unsuccessful, along with an override indicator 278 indicating whether the mobile subscriber's privacy was "overridden" can also be stored in the mobile subscriber's positioning record 265. However, it should be understood that in some cases this "override" information may not be revealed to the mobile subscriber. For example, if the requesting LA 280 is a law enforcement agency, this "override" information will not be provided to the mobile subscriber.

After the GMLC 290 collects and stores all of the relevant positioning information 271 for the positioning request 285 in the mobile subscriber's positioning record 265 (step 445), transmitting logic 258 within the GMLC 290 can send this record 265 to the MS 20 associated with the mobile subscriber (step 450) in, for example, a Short Message Service (SMS) or Unstructed Supplementary Service Data (USSD) message 220 via the serving MSC 14. The GMLC 290 can either send this SMS or USSD message 220 immediately after completion of the positioning process, whether successful or unsuccessful, or at a predefined frequency, e.g., once per day if any request 285 for positioning was received for the mobile subscriber. Alternatively, the GMLC 290 can forward the mobile subscriber's positioning record 265 to a billing center 230 associated with the MS's 20 home PLMN 10 to be included within the mobile subscriber's monthly bill 235. It should be noted that if the mobile subscriber is visiting the network 10, the temporary positioning record 265 associated with the mobile subscriber can also either be sent to the mobile subscriber as an SMS message 220 or be sent to the mobile subscriber's home PLMN 10 billing center 230 for inclusion in the mobile subscriber's monthly bill 235.

In an alternative embodiment, downloading logic 240 within the GMLC 290 can download the mobile subscriber's positioning record 265 to the HLR 26 associated with the MS 20 immediately upon completion of the positioning process or at predefined intervals. The HLR 26 can append this positioning record 265, and preferably, a time stamp 248, to the mobile subscriber's permanent record 245 in the HLR 26. The HLR 26 can, in turn, either send an SMS message 220 to the MS 20 via the MSC 14 or provide this record to the PLMN 10 billing center 230 for inclusion in the mobile subscriber's monthly bill 235.

Alternatively, the GMLC 290 can still provide the mobile subscriber's positioning record 265 either directly to the MS 20, using an SMS or USSD message 220, or to the PLMN 10 billing center 230. Subsequently, after the GMLC 290 provides this positioning information 271 within the record 265 to the mobile subscriber, the downloading logic 240 within the GMLC 290 can download the mobile subscriber's positioning record 265 to the HLR 26 for permanent storage therein, and the GMLC 290 can delete from it's records any unnecessary or extraneous information not needed to be retained by the GMLC 290 for billing purposes of the requesting LA 280.

Figure 5:
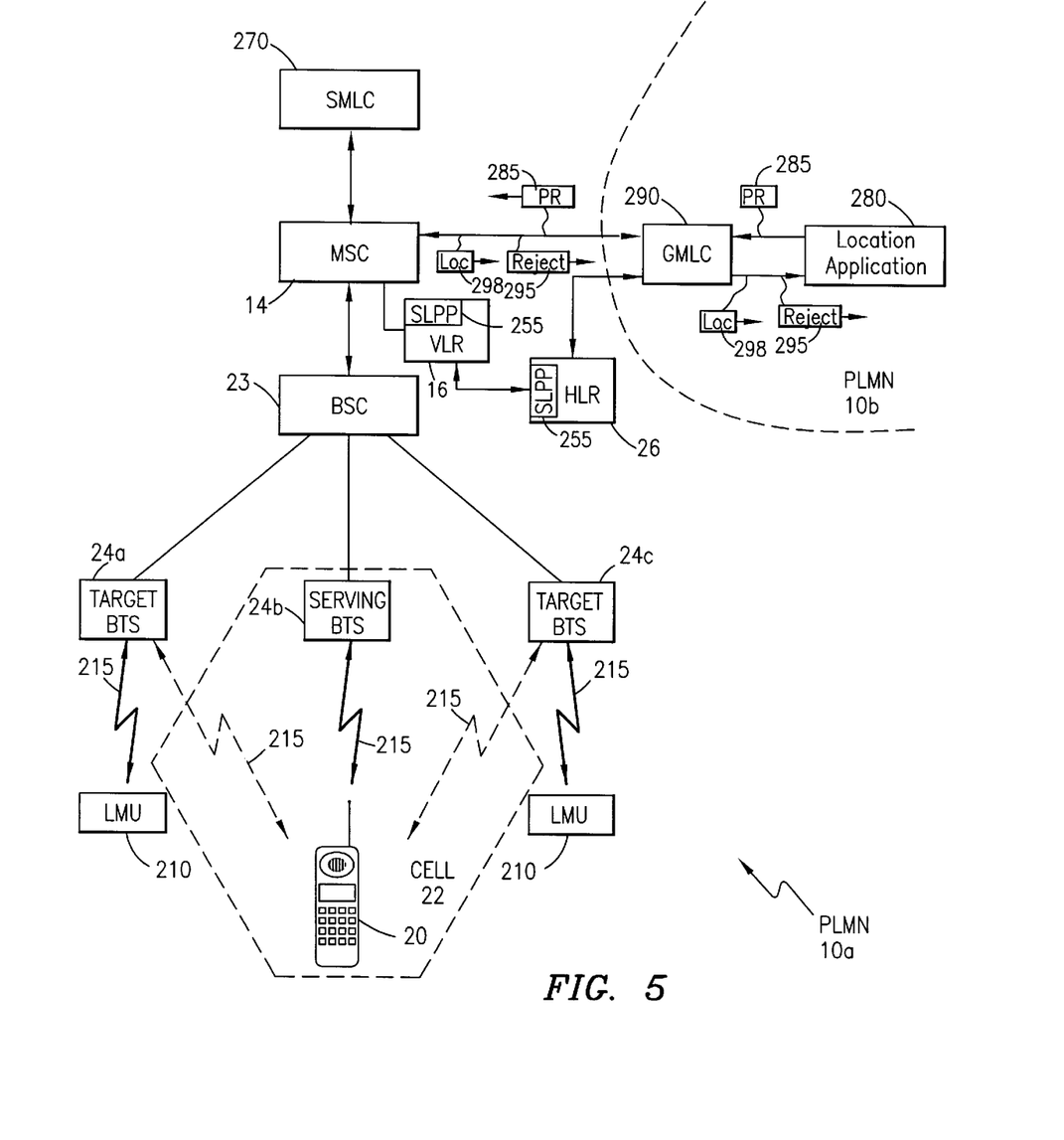
FIG. 5 illustrates a sample positioning of a mobile station within a cellular network.
Figure 6A:
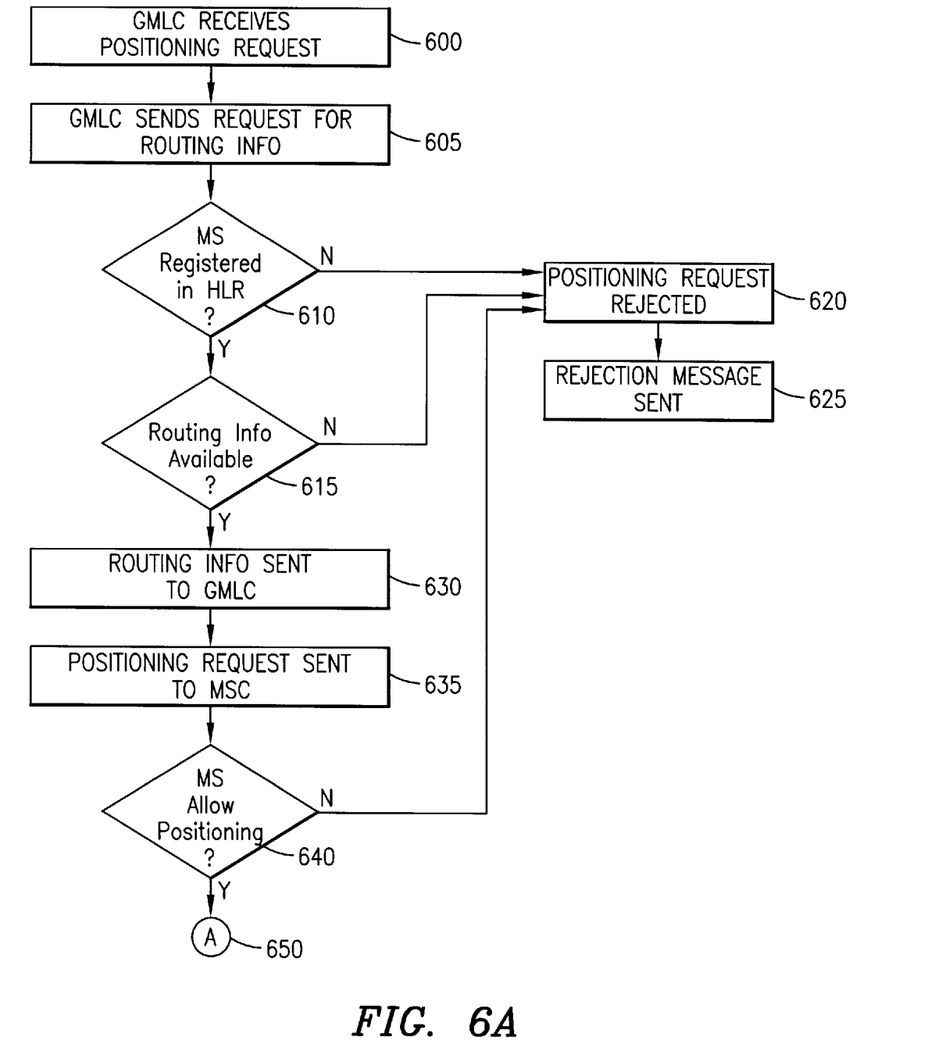
FIGS. 6A and 6B show steps in implementing the sample positioning shown in FIG. 5 of the drawings.

A more complete understanding of aspects of the positioning process involved in the present invention will now be described with reference to FIG. 5 of the drawings, which will be described in connection with FIGS. 6A and 6B of the drawings. When the GMLC 290 within the PLMN 10b of the requesting LA 280 receives the positioning request 285 (step 600), the GMLC 290 sends a request for routing information (step 605), e.g., the address of the serving MSC 14 within the PLMN 10a that the MS 20 is currently located in, to the MS's HLR 26, using the MS's 20 directory number as a global title. The signaling network, e.g., the Signaling System #7 (SS7) network (not shown), can perform a global title translation on the MSISDN and route the request to the appropriate HLR 26 for the MS 20.

The HLR 26 checks its records to confirm that the MS 20 is registered in the HLR 26 (step 610), and that routing information for that MS 20 is available (step 615). If the MS 20 is not registered in the HLR 26 (step 610) or the routing information is not available (step 615), the positioning request 285 is rejected (step 620) and the GMLC 290 sends a rejection message 295 to the requesting LA 280 (step 625). However, if the MS 20 is registered in the HLR 26 (step 610) and routing information for the MSC 14 is available (step 615), the routing information, e.g., the MSC 14 address is sent to the GMLC 290 (step 630). Using this MSC 14 address, the GMLC 290 transmits a MAP_PROVIDE_SUBSCRIBER_LOCATION message, which contains the positioning request 285, to the serving MSC 14 (step 635).

The MSC 14 verifies that the MS 20 allows positioning to be performed (step 640), e.g., by checking the SLPP 255, sent by the HLR 26 to the VLR 16, and if the MS 20 does not allow positioning (step 640), the positioning request 285 is rejected (step 620) and a rejection message 295 is sent to the LA 280 (step 625). If the mobile subscriber allows positioning (step 640), positioning of the MS 20 continues (step 650).

Figure 6B:
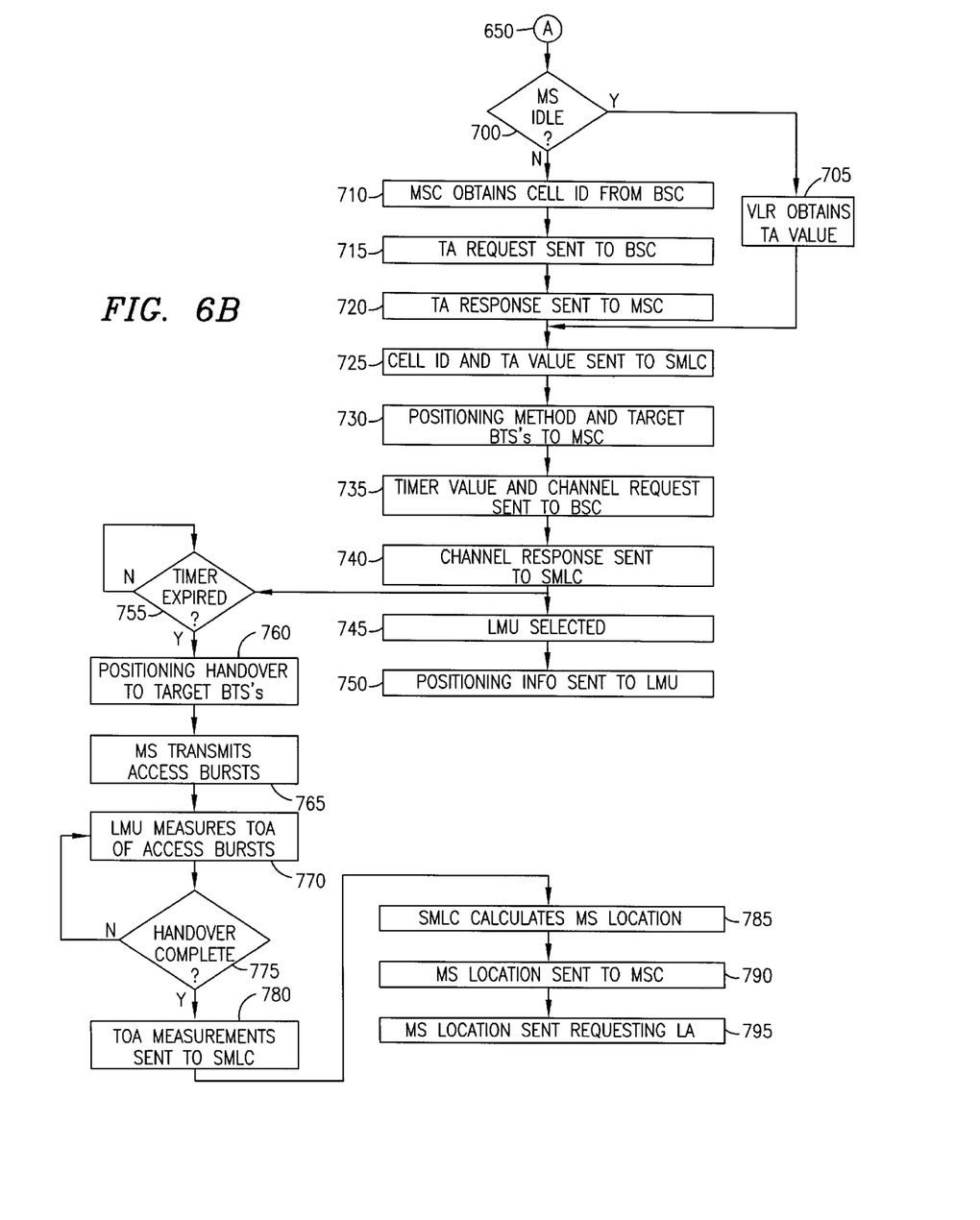

With reference now to the steps described in FIG. 6B of the drawings, if the MS 20 is in idle mode (step 700), the VLR 16 performs paging and authentication of the MS 20, along with ciphering of the positioning data. This procedure provides the current cell 22 ID and Timing Advance (TA) value for a serving Base Transceiver Station (BTS) 24b in a BSSMAP Complete layer 3 message, which is used to convey a paging response (step 705). However, if the MS 20 is in dedicated mode (step 700), e.g., involved in a call connection, the MSC 14 obtains the current cell 22 ID from a serving Base Station Controller (BSC) 23 (step 710) and sends a BSSMAP TA request to the serving BSC 23 (step 715). The serving BSC 23 obtains a current TA value from the serving BTS 24b and returns this current TA value in a BSSMAP TA response to the MSC 14 (step 720).

Upon receipt of the current cell 22 ID and TA value (step 705 or 720), the MSC 14 sends a MAP_PERFORM_LOCATION message, which includes the current cell 22 ID and TA value, to the SMLC 270 associated with the MS's 20 current cell 22 location (step 725). The SMLC 270 determines the positioning method to use, e.g., Time of Arrival (TOA), Enhanced Observed Time Difference (E-OTD) or Global Positioning System (GPS). If, for example, TOA is selected, the SMLC 270 sends a MAP Channel Information message, which contains an indication that TOA should be used along with a list of target BTS's 24a and 24c to which a positioning handover must be performed, to the MSC 14 (step 730). In response, the MSC 14 sends a BSSMAP CHANNEL INFORMATION message to the BSC 23, requesting a physical channel description of the allocated traffic channel, if the MS 20 is in dedicated mode. The BSSMAP CHANNEL INFORMATION message also includes a timer value (not shown) and the list of target BTS's 24a and 24c (step 735). The BSC 23 returns the physical channel description and other related information to the SMLC 270 via the MSC 14 (step 740).

Based upon this received information (step 740), the SMLC 270 selects at least one Location Measurement Unit (LMU) 210 to measure and transmit positioning data to the SMLC 270 (step 745). Positioning data measurement information, which includes the identity of at least one target BTS 24a to which a positioning handover must be performed, is sent to the selected LMU 210 via the MSC 14 over the air interface 215 (step 750).

At the expiration of the timer value in the BSC 23 (step 755), the BSC 23 informs the target BTS's 24a and 24c that a positioning handover needs to be performed (step 760). Taking one target BTS 24a, the BSC 23 sends a command to the MS 20 via the serving BTS 24b over the air interface 215 to transmit a HANDOVER ACCESS message, including access bursts, to the target BTS 24a (step 765). During the time that the MS 20 is waiting for a response from the target BTS 24a, e.g., around 320 milliseconds for a traffic channel, the LMU 210 measures the TOA of the access bursts sent by the MS 20 (step 770). After the target BTS 24a indicates to the BSC 23 in a HANDOVER DETECTION message that the required number of access bursts was received, and the MS 20 sends a HANDOVER COMPLETE message to the BSC 23 (step 775), the LMU 210 sends the TOA measurements to the SMLC 270 via the MSC 14 (step 780). Using these TOA measurements and the previously obtained TA value, the SMLC 270 calculates the location of the MS 20 (step 785) and transmits this location information 298 to the MSC 14 (step 790), which can forward this location information 298 to the requesting LA 280 via the GMLC 290 (step 795).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A gateway mobile location center for collecting, storing and transmitting positioning information related to a received positioning request for a mobile subscriber, comprising:

receiving logic for receiving said positioning request from a location node, said positioning request having identity information associated with said location node;

a memory having a database therein for storing at least one positioning record, said at least one positioning record being associated with said mobile subscriber, said at least one positioning record comprising at least said identity information; and transmitting logic for transmitting at least said identity information within said at least one positioning record to a home location register associated with said mobile subscriber, said home location register transmitting at least said identity information to said mobile subscriber.

2. The gateway mobile location center of claim 1, wherein said transmitting logic transmits at least said identity information to a mobile station associated with said mobile subscriber in a Short Message Service message.

3. The gateway mobile location center of claim 1, wherein said transmitting logic transmits at least said identity information to a mobile station associated with said mobile subscriber in an Unstructured Supplementary Service Data message.

4. The gateway mobile location center of claim 1, wherein said transmitting logic transmits at least said identity information to a billing center of a home network associated with said mobile subscriber.

5. The gateway mobile location center of claim 1, wherein said at least one positioning record further comprises date and time information associated with the date and time said positioning request was received.

6. The gateway mobile location center of claim 1, wherein said at least one positioning record further comprises a successful indicator for indicating whether said positioning request was successful and location information if said successful indicator indicates that said positioning request was successful.

7. The gateway mobile location center of claim 1, wherein said at least one positioning record further comprises an override indicator for indicating whether privacy information associated with said mobile subscriber was overridden by said location node.

8. The gateway mobile location center of claim 7, wherein said privacy information is a Subscriber Location Privacy Profile.

9. A telecommunications system for maintaining positioning information associated with a positioning request for a mobile subscriber and transmitting at least portions of said positioning information to said mobile subscriber, comprising:

a gateway mobile location center for receiving a positioning request having identity information associated therewith for said mobile subscriber and transmitting at least said identity information to said mobile subscriber;

a positioning record associated with said mobile subscriber within a database within a memory of said gateway mobile location center for storing at least said identity information; and a home location register associated with said mobile subscriber for receiving at least said identity information within said at least one positioning record from said gateway mobile location center and transmitting at least said identity information to said mobile subscriber.

10. The telecommunications system of claim 9, further comprising:

a mobile station associated with said mobile subscriber for receiving at least said identity information from said gateway mobile location center in a Short Message Service message.

11. The telecommunications system of claim 9, further comprising:

a billing center of a home network associated with said mobile subscriber for receiving at least said identity information from said gateway mobile location center and producing a bill for said mobile subscriber including at least said identity information.

12. The telecommunications system of claim 9, wherein said positioning record further comprises date and time information associated with the date and time said positioning request was received.

13. The telecommunications system of claim 9, wherein said positioning record further comprises a successful indicator for indicating whether said positioning request was successful and location information if said successful indicator indicates that said positioning request was successful.

14. The telecommunications system of claim 9, wherein said positioning record further comprises an override indicator for indicating whether said privacy information associated with said mobile subscriber was overridden by said location node.

15. The telecommunications system of claim 14, wherein said privacy information is a Subscriber Location Privacy Profile.

16. The telecommunications system of claim 9, wherein said home location register further comprises:

a subscriber record associated with said mobile subscriber, said positioning record being appended to said subscriber record along with a time stamp.

17. A method for maintaining positioning information associated with a positioning request for a mobile subscriber and transmitting at least portions of said positioning information to said mobile subscriber, comprising the steps of:

receiving, by a gateway mobile location center, a positioning request having identity information associated therewith for said mobile subscriber;

storing, within a positioning record associated with said mobile subscriber within said gateway mobile location center, at least said identity information; and transmitting at least said identity information to a home location register associated with said mobile subscriber, said home location register transmitting at least said identity information to said mobile subscriber.

18. The method of claim 17, wherein said step of transmitting further comprises the step of:

transmitting at least said identity information to a mobile station associated with said mobile subscriber in a Short Message Service message.

19. The method of claim 17, wherein said step of transmitting further comprises the step of:

transmitting at least said identity information to a mobile station associated with said mobile subscriber in an Unstructured Supplementary Service Data message.

20. The method of claim 17, wherein said step of transmitting further comprises the steps of:

transmitting at least said identity information to a billing center of a home network associated with said mobile subscriber; and producing, by said billing center, a bill for said mobile subscriber including at least said identity information.

21. The method of claim 17, wherein said step of storing further comprises the step of:

storing, within said positioning record, date and time information associated with the date and time said positioning request was received.

22. The method of claim 17, wherein said step of storing further comprises the step of:

storing, within said positioning record, a successful indicator for indicating whether said positioning request was successful and location information if said successful indicator indicates that said positioning request was successful.

23. The method of claim 17, wherein said step of storing further comprising the step of:

storing, within said positioning record, an override indicator for indicating whether privacy information associated with said mobile subscriber was overridden by said location node.

24. The method of claim 17, wherein said step of receiving at least said identity information by said home location register further comprises the step of:

appending, to a subscriber record associated with said mobile subscriber within said home location register, at least said identity information and a time stamp.

* * * * *

UNITED STATES PATENT AND TRADEMARK OFFICE
CERTIFICATE OF CORRECTION

PATENT NO. : 6,463,288 B1
DATED : October 8, 2002
INVENTOR(S) : Theodore Havinis et al.

It is certified that error appears in the above-identified patent and that said Letters Patent is hereby corrected as shown below:

<u>Title page,</u>
Item [57], ABSTRACT,
Lines 7 and 11, replace "requester" with -- requestor --

<u>Column 2,</u>
Lines 49-50, replace "in addition" with -- In addition --

<u>Column 4,</u>
Lines 27, 30 and 33, replace "requester" with -- requestor --

Signed and Sealed this

Eleventh Day of February, 2003

JAMES E. ROGAN
*Director of the United States Patent and Trademark Office*